United States Patent

Suh et al.

(10) Patent No.: US 9,348,075 B2
(45) Date of Patent: May 24, 2016

(54) METHOD OF MANUFACTURING POLARIZING PLATE, POLARIZING PLATE MANUFACTURED BY THE SAME, AND LIQUID CRYSTAL DISPLAY HAVING THE POLARIZING PLATE

(75) Inventors: Duckjong Suh, Seoul (KR); Jeonguk Heo, Asan-si (KR); Hee Wook Do, Cheonan-si (KR); Jung-Hun Lee, Seoul (KR); Boo-Kan Ki, Seoul (KR); Min Oh Choi, Asan-si (KR); Sang-Gu Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 1227 days.

(21) Appl. No.: 12/850,653

(22) Filed: Aug. 5, 2010

(65) Prior Publication Data

US 2011/0249223 A1 Oct. 13, 2011

(30) Foreign Application Priority Data

Apr. 8, 2010 (KR) .................. 10-2010-0032379

(51) Int. Cl.
*G02F 1/1335* (2006.01)
*G02B 5/30* (2006.01)

(52) U.S. Cl.
CPC ........ *G02B 5/3033* (2013.01); *G02F 1/133528* (2013.01)

(58) Field of Classification Search
USPC ..................... 349/96, 187; 359/437
See application file for complete search history.

(56) References Cited

U.S. PATENT DOCUMENTS

| 5,456,795 | A * | 10/1995 | Danjo et al. | 216/93 |
| 6,606,136 | B2 * | 8/2003 | Matsumoto et al. | 349/96 |
| 2005/0007019 | A1 * | 1/2005 | Kim et al. | 313/607 |
| 2006/0066788 | A1 * | 3/2006 | Utsumi et al. | 349/120 |
| 2007/0107834 | A1 * | 5/2007 | Tsai | 156/229 |
| 2007/0121030 | A1 * | 5/2007 | Sato | 349/64 |
| 2007/0200967 | A1 * | 8/2007 | Fu et al. | 349/43 |
| 2009/0096961 | A1 * | 4/2009 | Nagai et al. | 349/96 |
| 2010/0221455 | A1 * | 9/2010 | Kim et al. | 428/1.1 |
| 2010/0277675 | A1 * | 11/2010 | Higashi et al. | 349/96 |
| 2010/0328584 | A1 * | 12/2010 | Toyama et al. | 349/96 |
| 2011/0054622 | A1 * | 3/2011 | Muratoglu et al. | 623/18.11 |

FOREIGN PATENT DOCUMENTS

| JP | 2002-333523 A | | 11/2002 | |
| JP | 2008-019383 | * | 1/2008 | ............ C09B 47/04 |
| JP | 2009-092587 A | | 4/2009 | |
| JP | 2009-181042 A | | 8/2009 | |

* cited by examiner

*Primary Examiner* — Edward Glick
*Assistant Examiner* — Anthony G Quash
(74) *Attorney, Agent, or Firm* — Cantor Colburn LLP

(57) ABSTRACT

A method of manufacturing a polarizing plate includes fabricating a base film, dyeing the base film by using iodine, stretching the base film to form a polarizing film, firstly drying the polarizing film at a first temperature, and secondly drying the polarizing film while sequentially increasing a temperature from the first temperature to a second temperature higher than the first temperature. The polarizing plate and a liquid crystal display including the same are manufactured through the above method.

16 Claims, 7 Drawing Sheets

METHOD OF MANUFACTURING POLARIZING PLATE, POLARIZING PLATE MANUFACTURED BY THE SAME, AND LIQUID CRYSTAL DISPLAY HAVING THE POLARIZING PLATE

This application claims priority to Korean Patent Application No. 10-2010-0032379 filed on Apr. 8, 2010, and all the benefits accruing therefrom under 35 U.S.C. §119, the contents of which are herein incorporated by reference in their entirety.

BACKGROUND OF THE INVENTION

1. Field of the Invention

The invention relates to a method of manufacturing polarizing plate, polarizing plate manufactured by the same, and a liquid crystal display having the polarizing plate.

2. Description of the Related Art

A liquid crystal display ("LCD") is a flat panel display including a liquid crystal display panel. Since the liquid crystal display panel is a non-emissive device, the liquid crystal display panel requires an additional light source. Therefore, the LCD includes a backlight unit to supply light to the liquid crystal display panel.

The backlight unit includes a plurality of light sources to output light. The light sources represent power consumption greater than that of other components of the LCD.

In this regard, a display apparatus is required to display images having high brightness while representing low power consumption.

BRIEF SUMMARY OF THE INVENTION

The invention provides a method of manufacturing a polarizing plate having high transmittance.

The invention also provides a polarizing plate manufactured through the method.

The prevent invention also provides a display apparatus including the polarizing plate and representing improved brightness.

In one exemplary embodiment, the method of manufacturing the polarizing plate is as follows. A base film is fabricated. The base film is dyed by using iodine. The base film is stretched to form a polarizing film, and the polarizing film is dried at a first temperature. Thereafter, the polarizing film is dried while sequentially increasing a temperature from the first temperature to a second temperature higher than the first temperature.

The first temperature is lower than a glass transition temperature of the polarizing film, and the second temperature is higher than the glass transition temperature of the polarizing film. The first temperature may be within a range of about 45° C. to about 55° C., and the second temperature may be within a range of about 70° C. to about 80° C.

The temperature is increased at a rate of about 3.0° C./min to about 4.0° C./min.

When the base film is dyed by using iodine, the base film is immersed into an iodine aqueous solution having a specific gravity of about 1.4 to about 1.7.

The polarizing film may be additionally dyed before drying the polarizing film at the first temperature. In order to additionally dye the polarizing film, the polarizing film is immersed into a potassium iodide aqueous solution.

Protective films may be attached to both surfaces of the polarizing film before drying the polarizing film.

When the polarizing plate manufactured through the above method has a thickness of about 25 micrometers (μm) to about 30 micrometers (μm), the polarizing plate has single transmittance of about 42.7% to about 43.8%. The polarizing plate has a contrast ratio of about 950 or more. The single transmittance of about 42.7% to about 43.8% at a thickness of about 25 μm to about 30 μm of the polarizing plate, and a contrast ratio of about 950 or more, are distinct structural characteristics of a finally formed polarizing plate defined by the method of forming the polarizing plate.

The polarizing plate manufactured through the above may be used in a display apparatus. The display apparatus includes a liquid crystal display panel and polarizing plates provided at opposing surfaces of the liquid crystal display panel. The single transmittance of about 42.7% to about 43.8% at a thickness of about 25 μm to about 30 μm of the polarizing plate, and a contrast ratio of about 950 or more, are distinct structural characteristics of a finally formed LCD defined by the method of forming the polarizing plate.

The liquid crystal display panel includes a first substrate including a plurality of pixels, a second substrate including color filters corresponding to each pixel, and a liquid crystal layer interposed between the first and second substrates.

The color filters include a pigment presented as chemical formula 1.

[chemical formula 1]

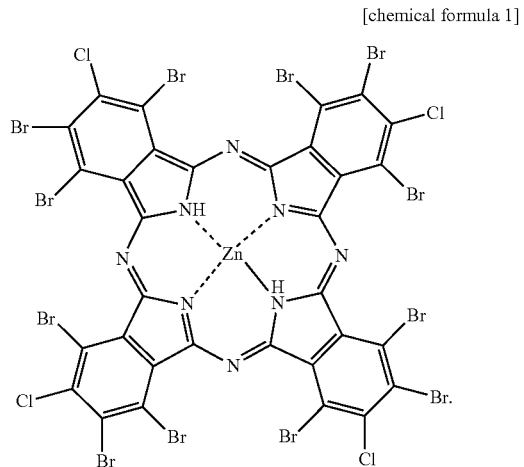

At least one light source is provided in opposition to one surface of the liquid crystal display panel to supply light to the liquid crystal display panel. The light source includes a cold cathode fluorescence lamp or an external electrode fluorescent lamp.

As described above, the invention can provide a polarizing plate having improved single transmittance and a method of manufacturing the same.

The display apparatus including the polarizing plate manufactured through the above method can represent brightness approximately identical to that of a conventional display apparatus even if the display apparatus employs the fewer number of light sources than that of light sources of the conventional display apparatus. Accordingly, the invention can provide a display apparatus having a fewer number of light sources than that of the conventional display and therefore representing lower power consumption.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
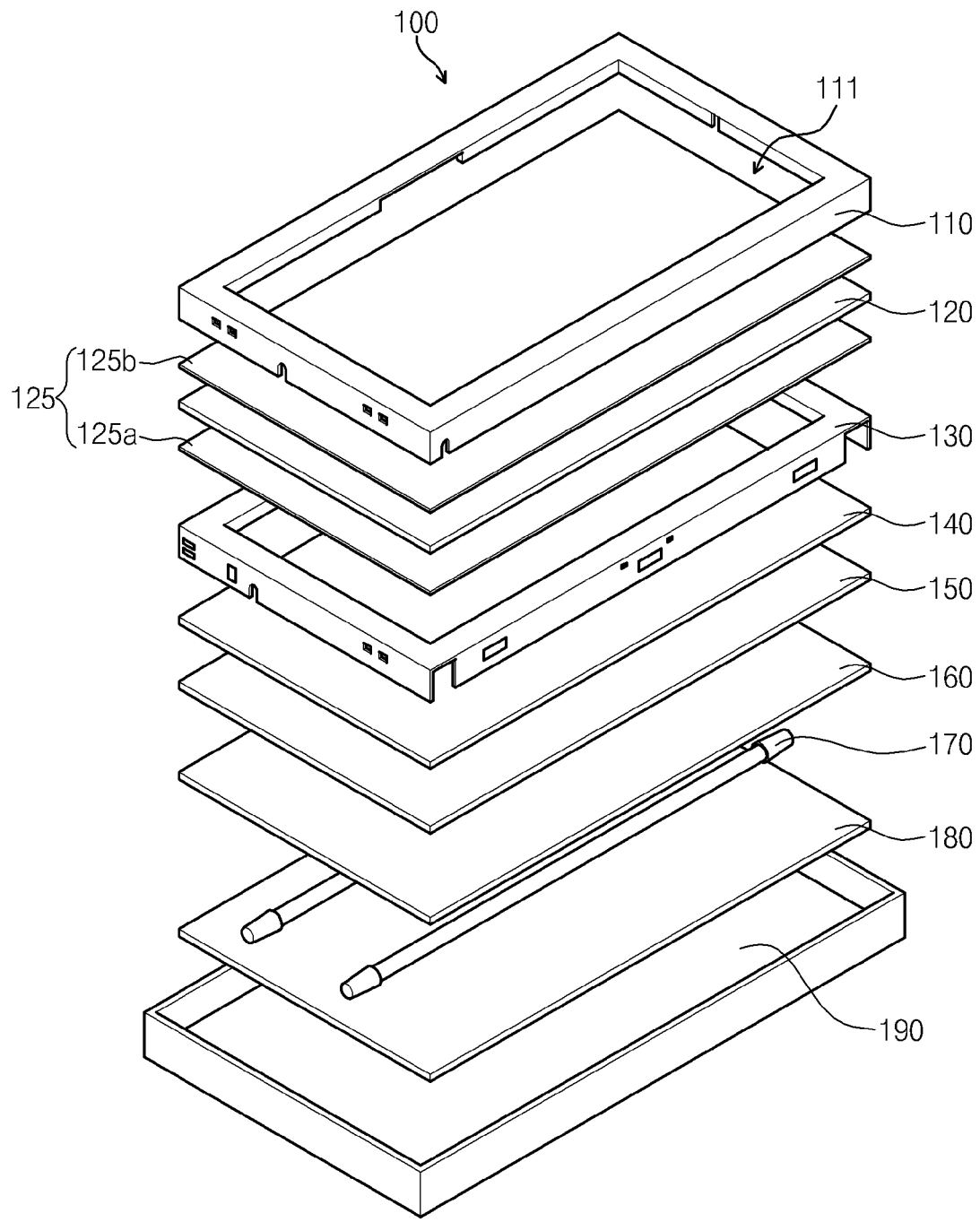
FIG. 1 is a perspective view showing an exemplary embodiment of a liquid crystal display ("LCD"), according to the invention.

The invention is not limited to the following embodiments but includes various applications and modifications. The following embodiments are provided to clarify the technical spirit disclosed in the invention and to sufficiently transmit the technical spirit of the invention to the one having mean knowledge and skill in this field. Therefore, the scope of the invention should not be limited to the following embodiments.

When describing each attached drawing, similar reference numerals are designated as similar components. In addition, the size of the layers and regions of the attached drawings along with the following embodiments are simplified or exaggerated for precise explanation or emphasis and the same reference numeral represents the same component.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the invention. Similarly, the second component may be named as the first component. The expression of the singular number in the specification includes the meaning of the plural number unless the meaning of the singular number is definitely different from that of the plural number in the context. As used herein, the term "and/or" includes any and all combinations of one or more of the associated listed items.

In the following description, the term 'include,' 'have' or 'comprising' may represent the existence of a feature, a number, a step, an operation, a component, a part or the combination thereof described in the specification, and may not exclude the existence or addition of another feature, another number, another step, another operation, another component, another part or the combination thereof. As used herein, the singular forms "a," "an" and "the" are intended to include the plural forms as well, unless the context clearly indicates otherwise.

In addition, when a layer, a film, a region, or a plate is mentioned as to be "on" another layer, another film, another region, or another plate, the layer, the film, the region, or the plate may be directly on another layer, another film, another region, or another plate, or a third layer, a third film, a third region, or a third plate may be interposed between the layer, the film, the region, or the plate and another layer, another film, another region, or another plate.

When a layer, a film, a region, or a plate is mentioned as to be "below" another layer, another film, another region, or another plate, the layer, the film, the region, or the plate may be directly "under" another layer, another film, another region, or another plate, or a third layer, a third film, a third region, or a third plate may be interposed between the layer, the film, the region, or the plate and another layer, another film, another region, or another plate. For the purpose of explanation, a portion of a display panel on which an image is displayed will be referred to as 'an upper portion', and a portion opposite to the upper portion will be referred to as 'a lower portion.' It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described with reference to accompanying drawings.

For the purpose of explanation, after describing a display apparatus employing a polarizing plate according to an embodiment of the invention, a method of manufacturing the polarizing plate will be described in detail.

FIG. 1 is a perspective view showing an exemplary embodiment of a liquid crystal display ("LCD") 100, according to the invention.

Referring to FIG. 1, the LCD 100 according to the illustrated embodiment of the invention includes a liquid crystal display panel 120 to display images, a polarizing plate 125, a backlight unit, an upper cover 110, and a lower cover 190.

The liquid crystal display panel 120 is provided in the shape of a rectangular plate having longer (e.g., longitudinal) and shorter (e.g., transverse) sides. The liquid crystal display panel 120 displays the images.

The polarizing plate 125 is attached to at least one surface of the liquid crystal display panel 120. A plurality of the polarizing plate 125 may be provided on one or more surfaces of the liquid crystal display panel, such as a polarizing plate 125 being attached to both of opposing surfaces of the liquid crystal display panel 120. As illustrated in FIG. 1, when a plurality of polarizing plates 125 are provided, the polarizing plates 125 include a first polarizing plate 125a attached to a first surface of the liquid crystal display panel 120, and a second polarizing plate 125b attached to a second surface of the liquid crystal display panel 120, the second surface opposing the first surface. The first and second polarizing plates 125a and 125b polarize light passing through the liquid crystal display panel 120. Details of the liquid crystal display panel 120 and the first and second polarizing plates 125a and 125b will be described later.

The backlight unit includes a mold frame 130, optical members 140, 150, and 160, a light source 170, and a reflective sheet 180. As illustrated in FIG. 1, the backlight unit may include a plurality of the light source 170.

The mold frame 130 is provided on edges of the liquid crystal display panel 120 to support the liquid crystal display panel 120. The mold frame 130 has the shape of a substantially rectangular ring or frame. The mold frame 130 is coupled with the lower cover 190 to receive the optical members 140, 150, and 160, the light sources 170, and the reflective sheet 180 therein. Although the mold frame 130 is provided in a single unitary indivisible piece as shown in FIG. 1, the mold frame 130 may be provided in plural pieces, which are assembled together, if necessary.

The optical members 140, 150, and 160 are provided below the mold frame 130, in a direction opposing a viewing side of the LCD 100. The optical members 140, 150, and 160 control light emitted from the light sources 170. The optical members 140, 150, and 160 include the diffusion sheet 160, the prism sheet 150, and the protective sheet 140 that are sequentially stacked.

The diffusion sheet 160 diffuses light emitted from the light sources 170. The prism sheet 150 concentrates the light, which has been diffused by the diffusion sheet 160, in a direction perpendicular to a plane of the liquid crystal display panel 120. The light, which has passed through the prism sheet 150, is incident into the liquid crystal display panel 120 in the direction perpendicular to the liquid crystal display panel 120. The protective sheet 140 protects the prism sheet 150 from being scratched. In an alternative embodiment, one, two or all of the optical members 140, 150, and 160 may be omitted.

In addition, the LCD 100 may further includes another optical member such as a brightness reinforcement film. With a brightness reinforcement film, all of the plural optical members 140, 150, and or 160 can be used, or only two or three optical members can be used by one optical member providing multiple functions.

The light sources 170 are provided at the rear or at the lateral side of the rear of the optical members 140, 150, and 160 to supply light to the liquid crystal display panel 120. Although the light sources 170 include a cold cathode fluorescence lamp in FIG. 1, the light sources 170 may include an external electrode fluorescent lamp, a hot cathode fluorescence lamp, or a light emitting diode.

The reflective sheet 180 is provided below the light sources 170 to reflect light, which is not supplied toward the liquid crystal display panel 120, thereby changing the path of the light such that the light is forward to the liquid crystal display panel 120.

The lower cover 190 is provided below the reflective sheet 180. The lower cover 190 receives the liquid crystal display panel 120, the light sources 170, and the reflective sheet 180 therein.

The upper cover 110 is provided above the liquid crystal display panel 120. The upper cover 110 is coupled with the lower cover 190. The upper cover 110 supports edges of front surface of the liquid crystal display panel 120. The upper cover 110 is provided therein with a display window 111 to expose a display region of the liquid crystal display panel 120.

In the LCD 100 having the above structure, the light output from the light sources 170 is supplied to the liquid crystal display panel 120 through the optical members 140, 150, and 160.

Figure 2:
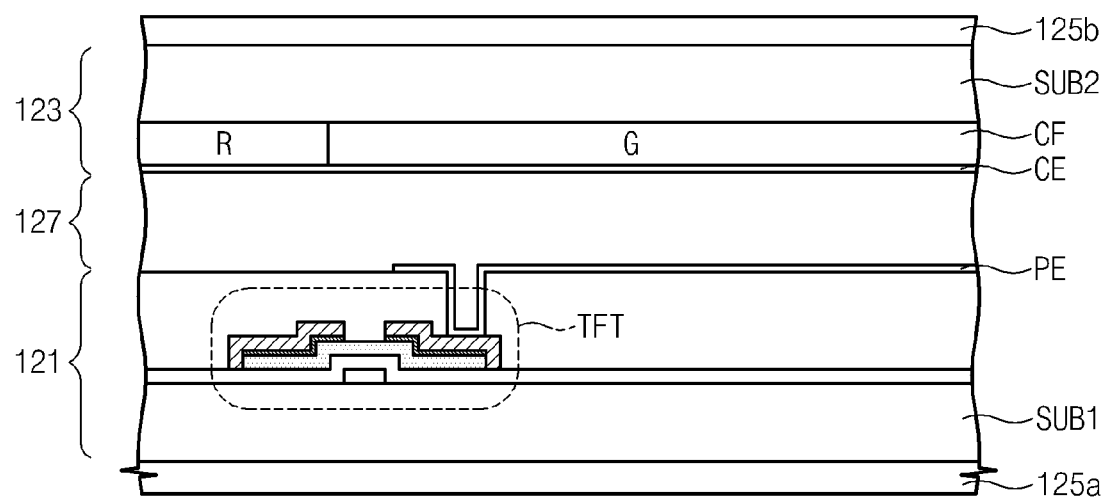
FIG. 2 is a sectional view showing a portion of the LCD in FIG. 1, according to the invention.

FIG. 2 is a sectional view showing a portion of the liquid crystal display panel 120 to which the polarizing plates 125a and 125b among the elements of FIG. 1, are attached. The liquid crystal display panel 120 according to one exemplary embodiment of the invention includes a plurality of a pixels, and the pixels have the same structure. FIG. 2 shows only a portion of one pixel in order to avoid redundancy of explanation.

Referring to FIG. 2, the liquid crystal display panel 120 includes a first substrate 121, a second substrate 123, and a liquid crystal layer 127. The first and second substrates 121 and 123 face each other while interposing the liquid crystal layer 127 therebetween. The liquid crystal layer 127 includes liquid crystal molecules.

The first substrate 121 includes a first insulating substrate SUB1, a thin film transistor TFT provided on the first insulating substrate SUB1, and a pixel electrode PE connected to the thin film transistor TFT.

The second substrate 123 includes a second insulating substrate SUB2, a plurality of a color filter CF, and a common electrode CE. The color filters CF are provided on the second insulating substrate SUB2. The color filters CF are used to allow light that has passed through the liquid crystal layer 127, to have a specific color. The color filters CF includes a plurality of a red color filter R, a plurality of a green color filter G, and a plurality of a blue color filter B (not shown).

The common electrode CE is provided on the color filters CF, and on substantially an entire of the second substrate 123. The common electrode CE applies an electric field to the liquid crystal layer 127, together with the pixel electrode PE, to drive the liquid crystal molecules in the liquid crystal layer 127.

The first insulating substrate SUB1 is provided on an outer surface thereof with the first polarizing plate 125a, and the second insulating substrate SUB2 is provided on an outer surface thereof with the second polarizing plate 125b. The first and second polarizing plates 125a and 125b may form the outermost elements and surfaces of a LCD module including the liquid crystal display panel 120 and the first and second polarizing plates 125a and 125b In the LCD 100 according to one exemplary embodiment of the invention, a number of the light source 170 varies depending on the size of the liquid crystal display panel 120. Preferably, the number of the light sources 170 is minimized such that power consumption of the backlight unit can be as lowered as possible. In one exemplary embodiment, for example, a twenty-two inch liquid crystal display panel may employ two of the light source 170.

If the number of the light sources 170 is reduced, the brightness and the contrast ratio of the images displayed on the LCD 100 may be decreased. According to one exemplary embodiment of the invention, when the number of the light sources 170 is reduced, the decrease in the brightness and the contrast ratio of the liquid crystal display panel 120 is compensated by corresponding the first and second polarizing plate 125a and 125b and the color filters CF to each other. As used herein, "corresponding" indicates being the same or aligned in quantity, shape, size or positional placement relative to another element. In one exemplary embodiment of the invention, in order to reduce or effectively prevent reduction of the brightness, the single transmittance of the first and second polarizing plate 125a and 125b is increased.

If the single transmittance of the first and second polarizing plate 125a and 125b is increased, the contrast ratio may be reduced with the reduction of the degree of polarization. According to one exemplary embodiment of the invention, in order to overcome the reduction of the contrast ratio, a polarizing plate capable of minimizing the reduction of the contrast ratio, while increasing single transmittance is provided, by changing conditions for the manufacturing process of first and second polarizing plate 125a and 125b.

Hereinafter, the structure of the first and second polarizing plate 125a and 125b, and a method of manufacturing the first and second polarizing plate 125a and 125b, according to exemplary embodiments of the invention will be described.

Figure 3:
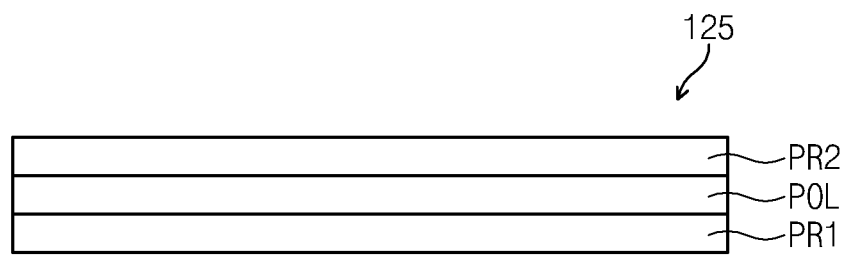
FIG. 3 is a sectional view showing an exemplary embodiment of the polarizing plate in FIG. 1, according to the invention.

FIG. 3 is a sectional view showing an exemplary embodiment of the polarizing plate 125 according to the invention. The polarizing plate 125 may be used as the first polarizing plate 125a and/or the second polarizing plate 125b.

The polarizing plate 125 includes a first protective layer PR1, a polarizing film POL, and a second protective layer PR2.

The polarizing film POL includes polymer resin stretched in a specific direction and iodine molecules adsorbed onto the polymer resin. The polymer resin and the iodine molecules absorb light vibrating in the specific direction to polarize light passing through the polarizing film POL.

The polymer resin may include polyvinyl alcohol resin. The polyvinyl alcohol resin may be formed by saponifying polyvinyl acetate resin. The polyvinyl acetate resin may be vinyl acetate polymer, or co-polymer formed by copolymerizing vinyl acetate with monomers which are copolymerizable with the vinyl acetate. Monomers, which are copolymerizable with the vinyl acetate, may include, but are not limited to, unsaturated carboxylic acid, olefin, vinyl ether, or unsaturated sulfonic acid.

The first protective layer PR1 is attached directly to a first surface of the polarizing film POL, and the second protective layer PR2 is attached directly to a second surface of the polarizing film POL. The first and second protective layer PR1 and PR2 are employed to protect the polarizing film POL.

The first and second protective layer PR1 and PR2 include polymer resin. The polymer resin includes at least one resin selected from the group of polyacetate resin, polyester resin, polyethersulfone resin, poly carbonate resin, polyamide resin, polyimide resin, polyolefin resin, polyacrylic resin, and poly norbornene resin. In one exemplary embodiment, the polyacetate resin may be triacetylcellulose ("TAC").

The polarizing plate 125 has a thickness of about 25 micrometers (μm) to about 30 μm. The first and second polarizing plates 125a and 125b may have single transmittance of about 42.7% and single transmittance of about 43.8%, respectively, and have a contrast ratio of 950 or more.

According to an alternative embodiment of the invention, in order to attach a polarizing plate 125 having the above structure to the liquid crystal display panel 120, an adhesion layer and/or a release film may be additionally stacked on one surface of the polarizing plate 125.

Figure 4:
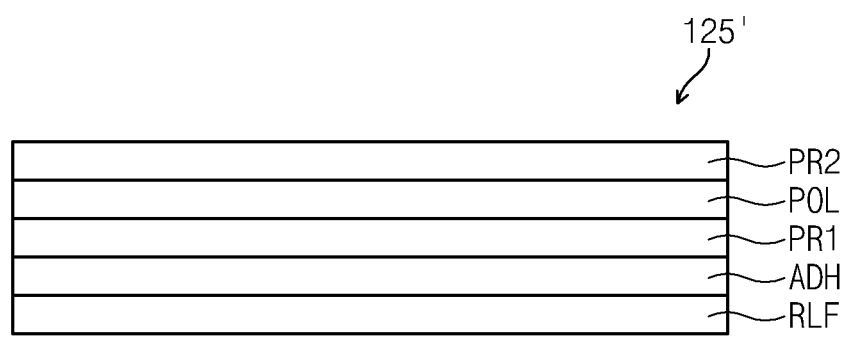
FIG. 4 is a sectional view showing another exemplary embodiment of the polarizing plate in FIG. 1, according to the invention.

FIG. 4 is a sectional view showing another exemplary embodiment of a polarizing plate 125', according to the invention. Hereinafter, the illustrated embodiment in FIG. 4 will be described while focusing on the difference from the embodiment in FIG. 3, in order to avoid redundancy of explanation. In addition, hereinafter, details of elements that are not described will be regarded as identical to those of the embodiment in FIG. 3, and the same reference numerals will be designated to the same elements.

According to the illustrated embodiment in FIG. 4 of the invention, an adhesion layer ADH is directly on an outer surface of the first protective layer PR1 of the polarizing plate 125 in FIG. 3. The adhesion layer ADH is employed to stably attach the polarizing plate 125' to a surface of the liquid crystal display panel 120.

A release film RLF may be provided directly on an outer surface of the adhesion layer ADH. Since the release film RLF is used to protect the adhesion layer ADH, the release film RLF is removed from the adhesion layer ADH when the polarizing plate 125' is attached to the liquid crystal display panel 120.

Figure 5:
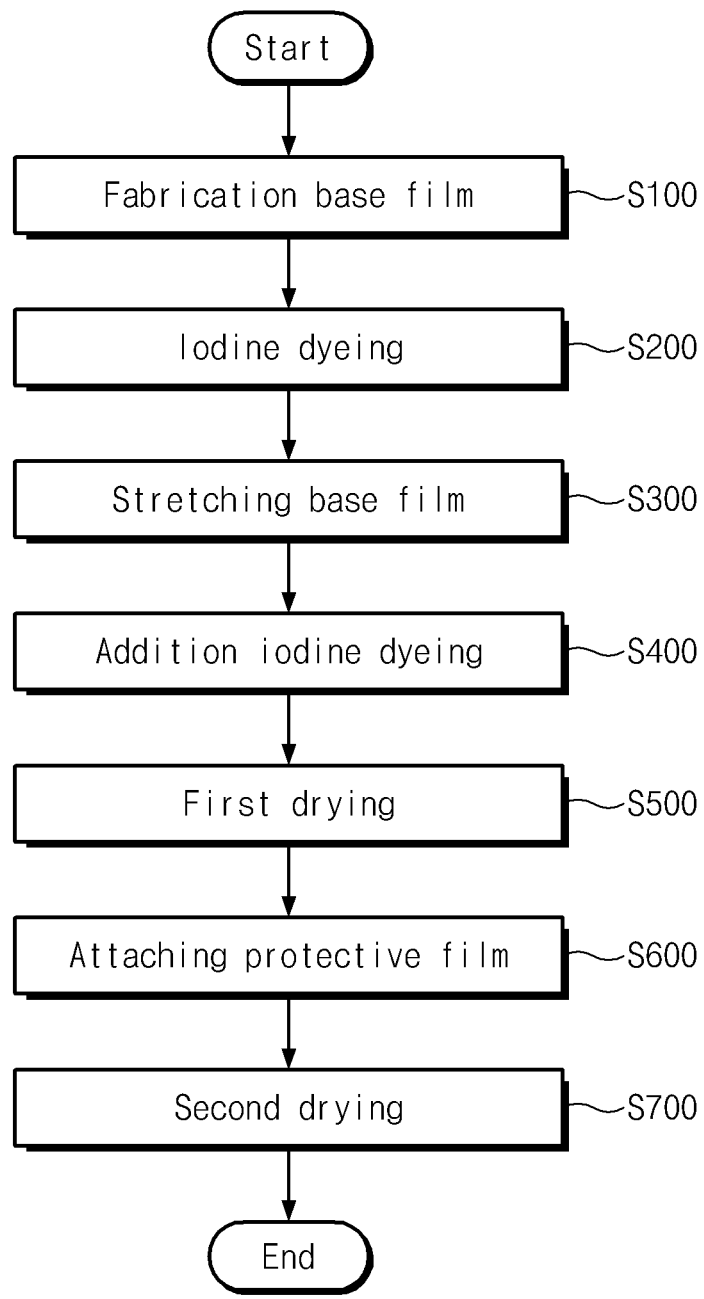
FIG. 5 is a flowchart showing an exemplary embodiment of a method of manufacturing the polarizing plate in FIG. 3, according to the invention.

FIG. 5 is a flowchart showing an exemplary embodiment of the method of manufacturing the polarizing plate 125 in FIG. 3, according to the invention.

The first polarizing plate 125a is formed through step S100 of fabricating a base film, step S200 of dyeing the fabricated base film using iodine, step S300 of stretching the fabricated base film to form a polarizing film, step S400 of additionally dyeing the formed polarizing film, first drying step S500 of drying the formed polarizing film at a first temperature, step S600 of attaching a protective layer on the formed polarizing film, and second drying step S700 of drying the polarizing film with the protective layer attached thereto, while sequentially increasing a temperature from the first temperature, to a second temperature higher than the first temperature.

The base film may be manufactured (step S100) by co-polymerizing a monomer of vinyl acetate. In addition, after preparing a monomer of vinyl acetate and another monomer that is copolymerizable with the vinyl acetate, the monomer of the vinyl acetate is copolymerized with the another monomer. Monomers, which are copolymerizable with the vinyl acetate, may include, but are not limited to, unsaturated carboxylic acid, olefin, vinyl ether, or unsaturated sulfonic acid.

The base film from step S100 is dyed in a dyeing bath (step S200). The dyeing bath contains an iodine aqueous solution including $I_3^-$ or $I_5^-$ ions. If the base film is immersed into the iodine aqueous solution, iodine molecules of the iodine aqueous solution are adsorbed onto the base film.

The iodine aqueous solution may be an aqueous solution containing iodine ions in which a potassium iodide aqueous solution is used as a solubilizing agent. The specific gravity of the iodine aqueous solution is in the range of about 1.4 to about 1.7. If the specific gravity is about 1.7 or more (especially, about 2.0 or more) due to high density of the iodine, the iodine molecules adsorbed onto the base film may be excessively increased, so that the single transmittance of the polarizing film, which is the result, is lowered. If the specific gravity is lower than about 1.4 due to low density of the iodine, a polarization effect may be reduced.

The base film dyed by the iodine aqueous solution in step S200 may be cleaned with water. The base film from step S200 may be immersed into water to be cleaned.

The base film from step S200 is stretched in a stretching bath. The base film is stretched in monoaxial direction or biaxial directions to form the polarizing film having a polarizing function (step S300).

The base film may be stretched through various schemes such as wet stretching or dry stretching. In exemplary embodiments, the dry stretching includes an inter-roll stretching method, a heated roll stretching method, and/or a compression stretching method. The base film may be stretched to about four times or eight times an original size thereof, through the dry stretching or the wet stretching. The base film may be stretched in multiple steps. In one exemplary embodiment, for example, the base film may be stretched in first and second stretching steps. The first and second stretching steps are changeable from each other according to stretching ratios.

Although the base film is stretched after the base film has been dyed according to the illustrated embodiment of the invention, the invention is not limited thereto. In one exemplary embodiment, for example, the base film may be stretched (step S300) before the base film is immersed into the iodine aqueous solution in the dyeing bath (step S200). In addition, the base film may be stretched while the base film is being immersed into the iodine aqueous solution and dyed, that is, steps S200 and S300 may be performed substantially simultaneously.

The formed polarizing film from steps S200 and S300 may be immersed into the iodine aqueous solution to be additionally dyed in an auxiliary dyeing bath (step S400). If necessary, step S400 of additionally dyeing the polarizing film may be omitted. The auxiliary dyeing bath is supplied with a potassium iodide aqueous solution. The potassium iodide aqueous solution contains $I_3^-$ or $I_5^-$ ions. The ions provide iodine molecules to be adsorbed onto the polarizing film. The density of iodine molecules adsorbed onto the polarizing film can be easily adjusted through the additionally dyeing step in the auxiliary dyeing bath.

The polarizing film, which has been dyed by the iodine aqueous solution in the auxiliary dyeing bath in step S400, may be cleaned with water. The cleaning may be performed by immersing the polbase film into water.

The polarizing film from step S400 is dried at a first temperature in a first dry zone (step S500). The first temperature is lower than a glass transition temperature of the polarizing film. The first temperature may be in the range of about 45° C. to about 55° C.

The protective layer may be attached to at least one surface of the polarizing film (S600). Embodiments of the invention have been described in that the first protective layer PR1 is attached to one surface of the polarizing film POL, and the second protective layer PR2 is attached to another surface of the polarizing film POL. If necessary, the step of attaching the protective layer may be omitted.

Although not shown, the first and second protective layers PR1 and PR2 are attached to the polarizing film POL by using an adhesive. When the first protective layer PR1 is attached to the polarizing film POL, an adhesive may be coated on one of the polarizing film POL and the first protective layer PR1, and then the first protective layer PR1 is bonded with the polarizing film POL by placing the first protective layer PR1 in opposition to the polarizing film POL. The second protective layer PR2 may be attached to the polarizing film POL similarly to the attaching scheme of the first protective layer PR1.

When the first and second protective layers PR1 and PR2 are attached on both of opposing side surfaces of the polarizing film POL, the first and second protective layers PR1 and PR2 may be attached to the polarizing film POL through various schemes such as a top-down scheme, a down-top scheme, and a horizontal bonding scheme. According to one exemplary embodiment of the invention, all of the three schemes may be employed.

The adhesive employed in attaching the first and second protective layers PR1 and PR2 to the polarizing film POL is transparent, and may include an optically isotropic material. The adhesive may include a polyvinyl alcohol-based adhesive. The polyvinyl alcohol-based adhesive may be a mixture that is formed by using water or hydrophilic organic solvent as a solvent. The solvent in the adhesive may be dried at a room temperature or above the room temperature such that the solvent is removed from the adhesive.

The protective layer may include polymer resin. The polymer resin includes at least one selected from the group of polyacetate resin, polyester resin, polyethersulfone resin, polycarbonate resin, polyamide resin, polyimide resin, polyolefin resin, polyacrylic resin, and poly norbornene resin. Particularly, the acetate resin may include triacetylcellulose ("TAC"). The protective layer may contain a UV absorber. The UV absorber may include a triazole absorber or benzophenone absorber. The UV absorber may be added by a predetermined amount within the about 10% or less reduction of the single transmittance with respect to a wavelength of about 380 nm.

The polarizing film from step S600 is dried in a second drying zone (step S700), which is named the second drying step. In the second drying step, the polarizing film is dried by sequentially increasing a temperature from the first temperature, to a second temperature higher than the first temperature. The second temperature may be higher than a glass transition temperature of the polarizing film. If the polarizing film is dried at a temperature higher than the glass transition temperature of the polarizing film, the degree of orientation of polymer constituting the polarizing film is improved, so that the contrast ratio is improved. The second temperature may be in the range of about 70° C. to about 80° C. In the second drying zone, the first temperature is increased to the second temperature at a rate of about 3.0° C./min to about 4.0° C./min.

The contrast ratio of the final polarizing plate may have various values depending on conditions for the manufacturing process of the final polarizing plate. If the conditions for the manufacturing process of the final polarizing plate are changed, the contrast ratio may be increased or decreased. According to one embodiment of the invention, a reduction of the contrast ratio is reduced or effectively prevented, by optimizing the step of drying the polarizing film in the first and second zones.

The final polarizing plate manufactured through the above method has the adhesion layer ADH provided on outer surfaces of the first protective layer PR1 and the second protective layer PR2, and the final polarizing plate is provided on an outer surface of the liquid crystal display panel 120, while interposing the respective adhesion layer ADH therebetween.

When the polarizing plate manufactured through the above method has a thickness of about 25 μm to about 30 μm, the single transmittance of the polarizing plate is in the range of about 42.7% to about 43.8%. The brightness of the LCD 100 according to the invention is improved by about 5% as compared with that of an LCD employing a conventional polarizing plate having the single transmittance of about 42%. The improvement of the brightness of the LCD 100 may result from the increase of the single transmittance of the polarizing plate, according to the invention. Additionally, the polarizing plate has a contrast ratio of 950 or more.

A polarizing plate having single transmittance in the range of about 42.7% to about 43.8% when having a thickness of about 25 μm to about 30 μm may be formed by processing of a base film, which includes dyeing the base film by using iodine, stretching the base film to form a polarizing film, firstly drying the polarizing film at a first temperature, and secondly drying the polarizing film. The single transmittance in the range of about 42.7% to about 43.8% when having a thickness of about 25 μm to about 30 μm is considered a structural characteristic of the final polarizing plate. Similarly, the polarizing plate having the single transmittance in the range of about 42.7% to about 43.8% when having a thickness of about 25 μm to about 30 μm, is considered a structural characteristic of the final LCD.

Since the single transmittance in the range of about 42.7% to about 43.8% when having a thickness of about 25 μm to about 30 μm of the polarizing plate is imparted by the dyeing a base film by using iodine, stretching the base film to form a polarizing film, firstly drying the polarizing film at a first temperature, and secondly drying the polarizing film, such process is considered to impart the distinct structural characteristic of the single transmittance in the range of about 42.7% to about 43.8% when having a thickness of about 25 μm to about 30 μm of the final polarizing plate, and similarly of the final LCD.

According to one embodiment of the invention, in order to optimize the contrast ratio and the brightness when the polarizing plate manufactured through the above method is used in the LCD 100, color filters of the liquid crystal display panel 120 corresponding to the polarizing plate may be employed. Particularly, green light contributes to the brightness of white light more than blue light or red light. Accordingly, the transmittance of the green light is increased, so that the brightness of the white light passing through the color filters CF can be effectively increased.

The green color filters G include pigment expressed as chemical formula 1.

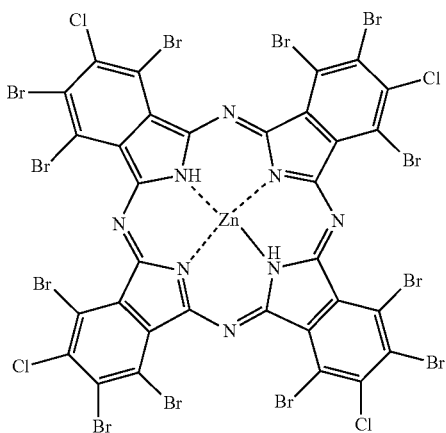

[chemical formula 1]

The pigment of chemical formula 1 is a complex employing zinc (Zn) as a central element. If the color filters CF include the pigment of chemical formula 1, the color filters CF have transmittance of green light higher than another color filters including a complex, which employs another element such as copper (Cu) as a central element, as pigment.

If the transmittance of the color filters CF are increased, the contrast ratio of the LCD 100 may be reduced. In order to prevent the contrast ratio from being reduced, the pigment used in the color filters CF is preferably maintained in a relatively small size. If the pigment has a larger size, light scattering is increased, so that the contrast ratio of the LCD 100 is reduced. In contrast, if the pigment has a smaller size, the light scattering is decreased, so that the contrast ratio of the LCD 100 is increased. In this regard, the pigment of chemical formula 1 is subject to milling in the manufacturing process such that pigment particles are not massed, and dispersed into a medium by a dispersant. In exemplary embodiments, the invention is not limited to a specific dispersant, and any of a number of the dispersant sufficient to uniformly disperse the pigment particles can be suitably selected.

The contrast ratio of the LCD 100 using the pigment is higher than the contrast ratio of an LCD using conventional pigment, by about 10% to about 15%.

The LCD 100 including the color filters CF and the polarizing plate represents values corresponding to $0.280<x<0.340$ and $0.300<y<0.360$ in CIE color coordinates.

Performance experimental results of a conventional polarizing plate and a conventional liquid crystal display panel, and the polarizing plate and the liquid crystal display panel according to the invention are as follows.

COMPARATIVE EXAMPLE 1 AND EXPERIMENT EXAMPLE 1

Comparative Example 1 represents a polarizing plate manufactured through a conventional manufacturing method, and a conventional liquid crystal display panel including the polarizing plate attached thereto. The conventional polarizing plate was manufactured through the following method.

A base film including polyvinyl acetate was fabricated. The base film was dyed in a dyeing bath containing an iodine aqueous solution with a specific gravity of 2.0. The base film was stretched in a stretching bath, thereby manufacturing a polarizing film. The polarizing film was dried at a temperature of about 69° C. for 5 minutes in the first drying zone. The polarizing film was bonded to a TAC film and then the polarizing film was dried in the second drying zone. A temperature of the second drying zone was maintained at a temperature of about 69° C., and dried for about 8 minutes. The conventional polarizing plate manufactured through the above method was attached to the conventional liquid crystal display panel.

Experimental Example 1 represents a polarizing plate manufactured according to one embodiment of the invention and a conventional liquid crystal display panel including the polarizing plate attached thereto, and the polarizing plate of the invention was manufactured through the following method.

A base film including polyvinyl acetate was fabricated. The base film was dyed in a dyeing bath containing an iodine aqueous solution with a specific gravity of about 1.5. The base film was stretched in a stretching bath, thereby manufacturing a polarizing film. The polarizing film was dried at a temperature of about 50° C. for about 5 minutes in the first drying zone. Then, after the polarizing film was bonded to a TAC film, the polarizing film was dried in the second drying zone. A initial temperature of the second drying zone was about 50° C., and the base film was dried while increasing the temperature of the second drying zone to about 75° C. at a rate of 3.4°

C./min. After the temperature of the second drying zone reached 75° C., the temperature was maintained. The total drying time of 8 minutes was spent in the second drying zone. The polarizing plate manufactured through the above method was attached to the conventional liquid crystal display panel.

Single Transmittance of Comparative Example 1 and Experimental Example 1

The conventional polarizing film of the Comparative Example 1 had the single transmittance of about 42.1%, and the polarizing film of the Experimental Example 1 had the single transmittance of about 43.1%.

Contrast Ratio of Experimental Example 1 and Comparative Example 1

Figure 6:
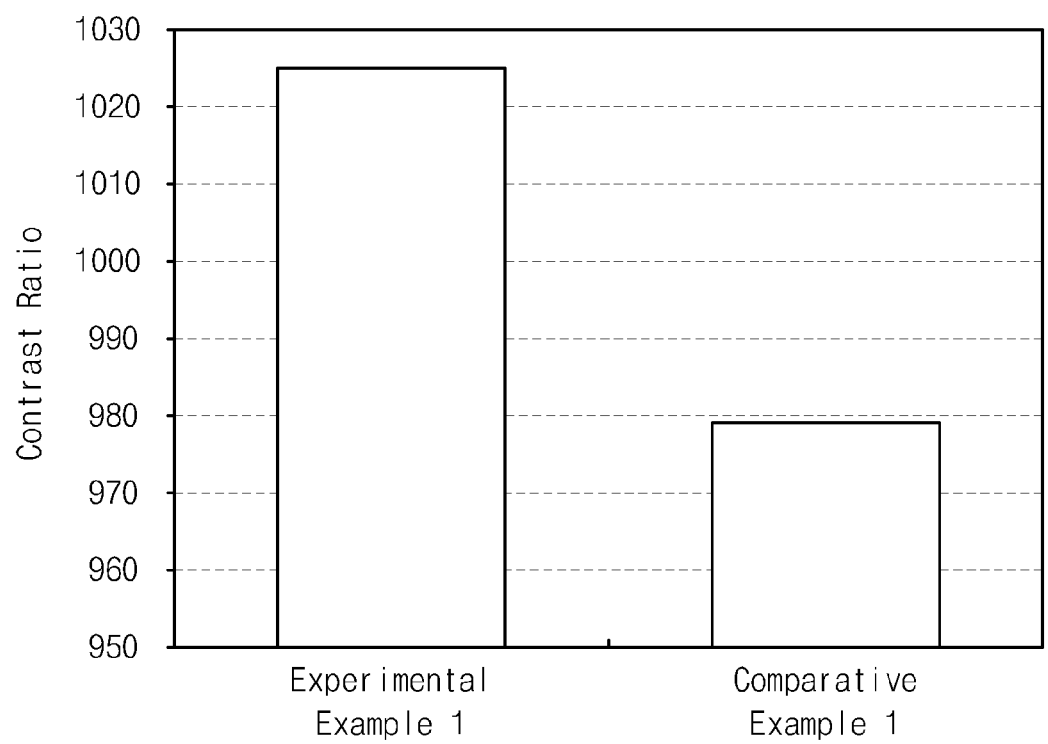
FIG. 6 is a graph showing a contrast ratio of an LCD according to an Experimental Example 1 and a Comparative Example 1.

FIG. 6 is a graph showing a contrast ratio of an LCD according to the Experimental Example 1 and the Comparative Example 1. In the case of the Experimental Example 1, the LCD represented the contrast ratio of about 1025. In the case of the Comparative Example 1, the LCD including the conventional polarizing plate represented the contrast ratio of about 980.

Brightness of Experimental Example 1 and Comparative Example 1

Figure 7:
FIG. 7 is a graph showing the brightness of the LCD according to the Comparative Example 1 and the Experimental Example 1.

FIG. 7 is a graph showing the brightness of the LCD according to the Comparative Example 1 and the Experimental Example 1. In the case of the Comparative Example 1, the LCD including the conventional polarizing plate represented the brightness nearly about 300 candela per square metre (nit). In the case of the Experimental Example 1, the LCD represented the brightness of about 312 nit or more.

Color Coordinates of Experimental Example 1

The polarizing plate according to the Experimental Example 1 represented a=−1.0±1.5, b=3.0±1.5 in CIE Lab color coordinates. Accordingly, the polarizing plate according to the Experimental Example 1 has a bluish characteristic.

COMPARATIVE EXAMPLE 2 AND EXPERIMENTAL EXAMPLE 2

Comparative Example 2 represents a case in which the conventional polarizing plate manufactured through the method of the Comparative Example 1, is attached to the LCD including the color filters according to one embodiment of the invention.

Experimental Example 2 represents a case in which the polarizing plate of the invention manufactured through the Experimental Example 1, is attached to the LCD including the color filters CF according to one embodiment of the invention.

Brightness of Comparative Example 2 and Experimental Example 2

Figure 8:
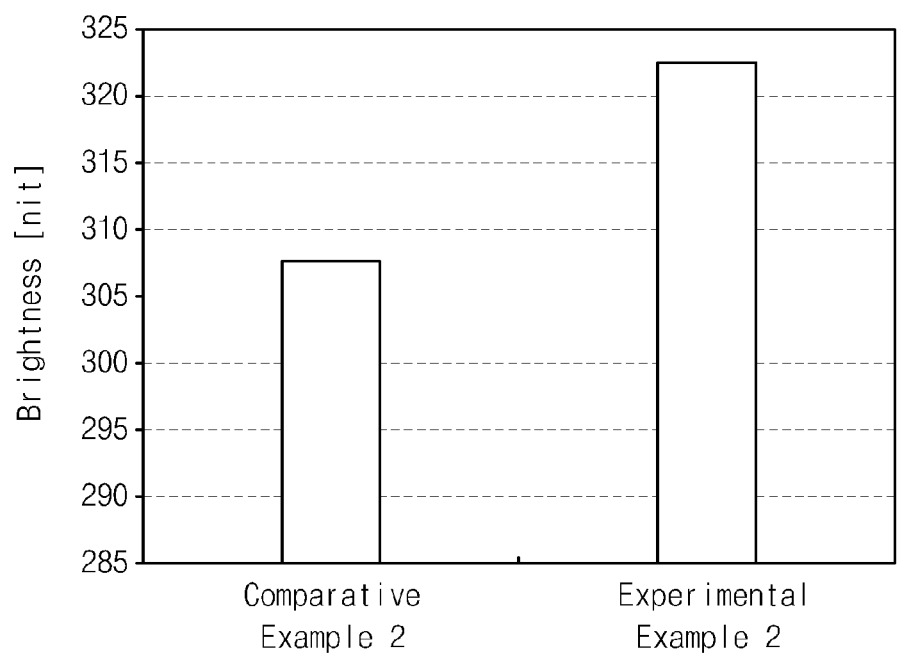
FIG. 8 is a graph showing the brightness of an LCD according to a Comparative Example 2 and an Experimental Example 2.

FIG. 8 is a graph showing the brightness of the LCD according to the Comparative Example 2 and the Experimental Example 2. In the case of the Comparative Example 2, the LCD including the conventional polarizing plate represented the brightness of about 306 nit. In the case of the Experimental Example 2, the LCD represented the brightness of about 322 nit.

When the polarizing plate according to the invention corresponded to the conventional LCD (FIG. 7), the brightness increasing rate reached about 4.8%. When the polarizing plate of the invention corresponded to the LCD employing the color filters CF (FIG. 8) according to one embodiment of the invention, the brightness improvement of about 7.6% was achieved. Accordingly, if the number of light sources is reduced, the brightness can be sufficiently compensated.

Color Coordinates of Comparative Example 2 and Experimental Example 2

Table 1 represents the color coordinates of the Comparative Example 2 and the Experimental Example 2.

TABLE 1

| Color coordinates | White x | White y |
|---|---|---|
| Comparative Example 2 | 0.324 | 0.345 |
| Experimental Example 2 | 0.317 | 0.335 |

As described above, x and y color coordinates of white color was able to be moved by about −7/1000 and about −10/1000, respectively, so that a color nearly a required color was able to be represented.

Reliability Evaluation of Comparative Example 2 and Experimental Example 2

Figure 9A:
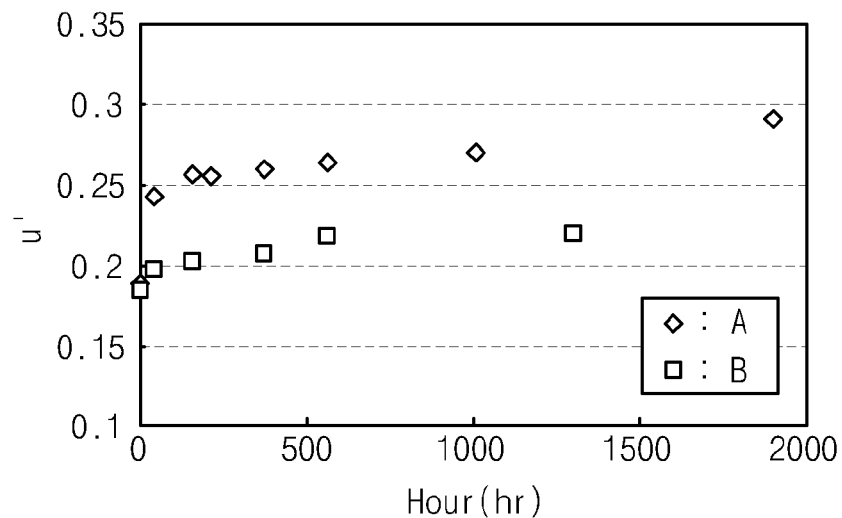
FIG. 9A is a graph showing u' value variation of polarizing plates of the Comparative Example 2 and the Experimental Example 2 in CIE L'a'b' color coordinates according to the lapse of time.
Figure 9B:
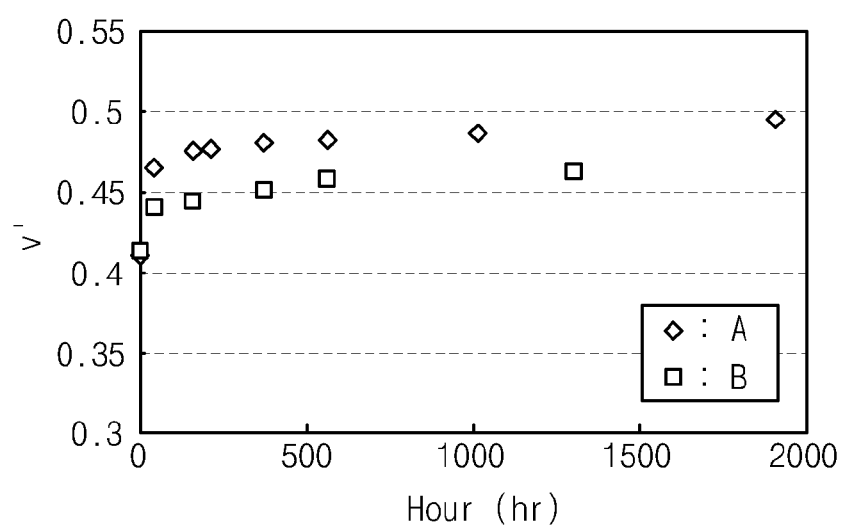
FIG. 9B is a graph showing v' value variation of polarizing plates of the Comparative Example 2 and the Experimental Example 2 in CIE L'a'b' color coordinates according to the lapse of time.

FIGS. 9A and 9B are graphs showing color variation of the polarizing plates of the Comparative Example 2 and the Experimental Example 2 according to the lapse of time. Particularly, FIGS. 9A and 9B are graphs showing variation of u' and v' values as a function of time in CIE L'a'b' color coordinates, respectively. In FIGS. 9A and 9B, symbol A (◇) represents the variation of u' and v' values of the Comparative Example 2, and symbol B (□) represents the variation of u' and v' values of the Experimental Example 2.

Referring to FIGS. 9A and 9B, the Experimental Example 2 represents color variation less than the Comparative Example 2, even with a lapse of time.

EXPERIMENTAL EXAMPLE 3

The Experimental Example 3 represents an LCD including a twenty-two inch liquid crystal display panel and two light sources. The LCD includes the polarizing plate manufactured through the method of the Experimental Example 1 and the color filters CF according to one embodiment of the invention.

Brightness and Contrast Ratio of Experimental Example 3

The LCD of the Experimental Example 3 represented the brightness of at least 230 nit. Particularly, the brightness of about 250 nit was represented at the center of the liquid crystal display panel. In the case of the Experimental Example 3, the contrast ratio was represented as 950 or more.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A method of manufacturing a polarizing plate, the method comprising:
   fabricating a base film;
   dyeing the base film by using iodine;
   stretching the base film to form a polarizing film;
   primarily drying the polarizing film at a first temperature;
   attaching a triacetylcellulose film to a surface of the polarizing film; and
   secondarily drying the polarizing film including the triacetylcellulose film, while sequentially increasing a temperature from the first temperature, to a second temperature higher than the first temperature, wherein the temperature is increased at a rate of about 3.0° C./min to about 4.0° C./min.

2. The method of claim 1, wherein the first temperature is lower than a glass transition temperature of the polarizing film, and the second temperature is higher than the glass transition temperature of the polarizing film.

3. The method of claim 2, wherein the first temperature is within a range of about 45° C. to about 55° C., and the second temperature is within a range of about 70° C. to about 80° C.

4. The method of claim 1, wherein the dyeing the base film includes immersing the base film into an iodine aqueous solution having a specific gravity of about 1.4 to about 1.7.

5. The method of claim 1, further comprising additionally dyeing the polarizing film before primarily drying the polarizing film.

6. The method of claim 5, wherein the additionally dyeing the polarizing film includes immersing the polarizing film into a potassium iodide aqueous solution.

7. The method of claim 1, wherein
the attaching a triacetylcellulose film to a surface of the polarizing film includes attaching the triacetylcellulose film to opposing surfaces of the polarizing film.

8. A polarizing plate comprising:
a polarizing film,
wherein the polarizing plate has a single transmittance of about 42.7% to about 43.8% when the polarizing plate has a thickness of about 25 μm to about 30 μm,
the polarizing plate defined by:
fabricating a base film;
dyeing the base film by using iodine;
stretching the base film to form the polarizing film;
primarily drying the polarizing film at a first temperature;
attaching a triacetylcellulose film to a surface of the polarizing film; and
secondarily drying the polarizing film including the triacetylcellulose film, while sequentially increasing a temperature from the first temperature, to a second temperature higher than the first temperature, wherein the temperature is increased at a rate of about 3.0° C./min to about 4.0° C./min.

9. The polarizing plate of claim 8, wherein the polarizing plate has a contrast ratio of about 950 or more.

10. The polarizing plate of claim 8, further comprising:
an adhesion layer on one surface of the polarizing plate; and
a release film attached onto the adhesion layer.

11. A liquid crystal display comprising:
a liquid crystal display panel; and
polarizing plates provided on opposing surfaces of the liquid crystal display panel, and including a polarizing film,
wherein at least one of the polarizing plates has a single transmittance of about 42.7% to about 43.8% when the polarizing plate has a thickness of about 25 μm to about 30 μm,
the polarizing plate defined by:
fabricating a base film;
dyeing the base film by using iodine;
stretching the base film to form the polarizing film;
primarily drying the polarizing film at a first temperature;
attaching a triacetylcellulose film to a surface of the polarizing film; and
secondarily drying the polarizing film including the triacetylcellulose film, while sequentially increasing a temperature from the first temperature, to a second temperature higher than the first temperature, wherein the temperature is increased at a rate of about 3.0° C./min to about 4.0° C./min.

12. The liquid crystal display of claim 11, wherein the liquid crystal display panel comprises:
a first substrate comprising a plurality of pixels;
a second substrate comprising a plurality of color filters corresponding to each pixel; and
a liquid crystal layer interposed between the first and second substrates.

13. The liquid crystal display of claim 12, wherein the color filters comprise red, green, and blue color filters, and the green color filters comprise a pigment expressed as chemical formula 1, chemical formula 1

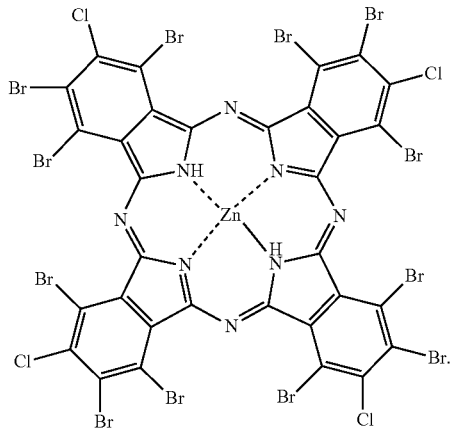

14. The liquid crystal display of claim 13, further comprising at least one light source facing one surface of the liquid crystal display panel to supply light to the liquid crystal display panel.

15. The liquid crystal display of claim 14, wherein the light source comprises a cold cathode fluorescence lamp or an external electrode fluorescent lamp.

16. The liquid crystal display of claim 11, further comprising an adhesion layer interposed between the polarizing plate and the liquid crystal display panel.

* * * * *